(12) United States Patent
Juzak et al.

(10) Patent No.: US 12,241,501 B2
(45) Date of Patent: Mar. 4, 2025

(54) CHANNEL FASTENER WITH TORQUE INDUCING ELEMENT

(71) Applicant: J. VAN WALRAVEN HOLDING B.V., Mijdrecht (NL)

(72) Inventors: Marek Juzak, Mijdrecht (NL); Frank Nijdam, Zeewolde (NL)

(73) Assignee: J. VAN WALRAVEN HOLDING B.V., Mijdrecht (NL)

( * ) Notice: Subject to any disclaimer, the term of this patent is extended or adjusted under 35 U.S.C. 154(b) by 756 days.

(21) Appl. No.: 17/432,605

(22) PCT Filed: Feb. 21, 2020

(86) PCT No.: PCT/NL2020/050106
§ 371 (c)(1),
(2) Date: Aug. 20, 2021

(87) PCT Pub. No.: WO2020/171709
PCT Pub. Date: Aug. 27, 2020

(65) Prior Publication Data
US 2022/0099123 A1    Mar. 31, 2022

(30) Foreign Application Priority Data
Feb. 21, 2019   (NL) .................................. 2022607

(51) Int. Cl.
*F16B 7/18* (2006.01)
*F16B 37/04* (2006.01)

(52) U.S. Cl.
CPC ............ *F16B 7/187* (2013.01); *F16B 37/042* (2013.01); *F16B 37/046* (2013.01)

(58) Field of Classification Search
CPC .. F16B 7/18; F16B 7/187; F16B 21/02; F16B 37/045; F16B 37/046; F16B 37/042;
(Continued)

(56) References Cited

U.S. PATENT DOCUMENTS 4,146,074 A * 3/1979 Kowalski ............... F16B 37/046
411/111
4,784,552 A * 11/1988 Rebentisch ........... F16B 37/046
403/348
(Continued)

FOREIGN PATENT DOCUMENTS

DE    19617750 C1    10/1997
DE    10036478 A1    2/2002
(Continued)

OTHER PUBLICATIONS

International Search Report for PCT/NL2020/050106 dated Jun. 9, 2020 (6 pgs).
(Continued)

*Primary Examiner* — Amber R Anderson
*Assistant Examiner* — Kevin J Baynes
(74) *Attorney, Agent, or Firm* — Tutunjian & Bitetto, P.C.

(57) ABSTRACT

A channel fastener for fastening to an elongate channel element including a washer element, an oblong anchoring element and a connecting element which connects the anchoring element to the washer element, while allowing the anchoring element to rotate with respect to the washer element. The fastener includes a torque-inducing element fixed to the anchoring element and includes at least one resiliently deformable limb arranged substantially offset from the rotational axis of the anchoring element and adapted for a sliding engagement with a flange of the channel element. When the anchoring element is inserted through the longitudinal slot into the channel element, the limb deforms while sliding along the flange towards the interior of the channel element, whereby a torque on the anchoring element is induced, which rotates the anchoring element towards a locking position in which it cannot be
(Continued)

retracted through the longitudinal slot of the channel element.

31 Claims, 4 Drawing Sheets

(58) Field of Classification Search
CPC ... Y10T 403/40; Y10T 403/50; Y10T 403/55; Y10T 403/57; Y10T 403/60; Y10T 403/602; Y10T 403/604; Y10T 403/606; Y10T 403/608; Y10T 403/7005
USPC .............................. 403/363, 380; 411/84, 85
See application file for complete search history.

(56) References Cited

U.S. PATENT DOCUMENTS

| | | | | |
|---|---|---|---|---|
| 4,830,531 | A * | 5/1989 | Condit | F16B 37/045 403/348 |
| 5,054,978 | A * | 10/1991 | Kowalski | F16B 37/046 411/432 |
| 5,067,863 | A * | 11/1991 | Kowalski | F16B 37/046 411/432 |
| 5,271,586 | A * | 12/1993 | Schmidt | F16B 37/046 248/68.1 |
| 6,511,028 | B1 * | 1/2003 | Gretz | F16L 3/14 248/68.1 |
| 6,572,057 | B1 * | 6/2003 | Roth | F16L 3/133 248/62 |
| 7,044,701 | B2 * | 5/2006 | Herb | F16B 37/046 411/84 |
| 7,073,995 | B2 * | 7/2006 | Herb | F16B 37/046 411/114 |
| 7,137,753 | B2 * | 11/2006 | Herb | F16B 7/0473 403/348 |
| 7,246,547 | B2 * | 7/2007 | Van Walraven | B25B 13/02 81/461 |
| 7,568,868 | B2 * | 8/2009 | Motsch | F16B 37/041 411/546 |
| 7,905,694 | B2 * | 3/2011 | van Walraven | F16B 21/18 411/85 |
| 9,531,319 | B2 * | 12/2016 | Braunstein | F24S 25/00 |
| 9,790,980 | B2 * | 10/2017 | McCarthy | F16B 37/045 |
| 2010/0180536 | A1 | 7/2010 | Reznar | |
| 2012/0073089 | A1 | 3/2012 | Buillas | |
| 2013/0071179 | A1 | 3/2013 | Mugg et al. | |
| 2016/0108946 | A1 | 4/2016 | Zajak et al. | |
| 2018/0347614 | A1 | 12/2018 | Reznar et al. | |

FOREIGN PATENT DOCUMENTS

| | | |
|---|---|---|
| DE | 69723643 T2 | 8/2003 |
| EP | 0837256 A1 | 4/1998 |
| EP | 1357304 A1 | 10/2003 |
| GB | 1319451 A | 6/1973 |
| GB | 2434423 A * | 7/2007 ............ F16B 37/046 |
| WO | WO-2019020320 A1 * | 1/2019 ............ F16B 37/046 |

OTHER PUBLICATIONS

Written Opinion for PCT/NL2020/050106 dated Jun. 9, 2020 (7 pgs).

First Examination Report issued in corresponding Indian Patent Application No. 202127042516 dated Nov. 22, 2022, pp. 1-5.

* cited by examiner

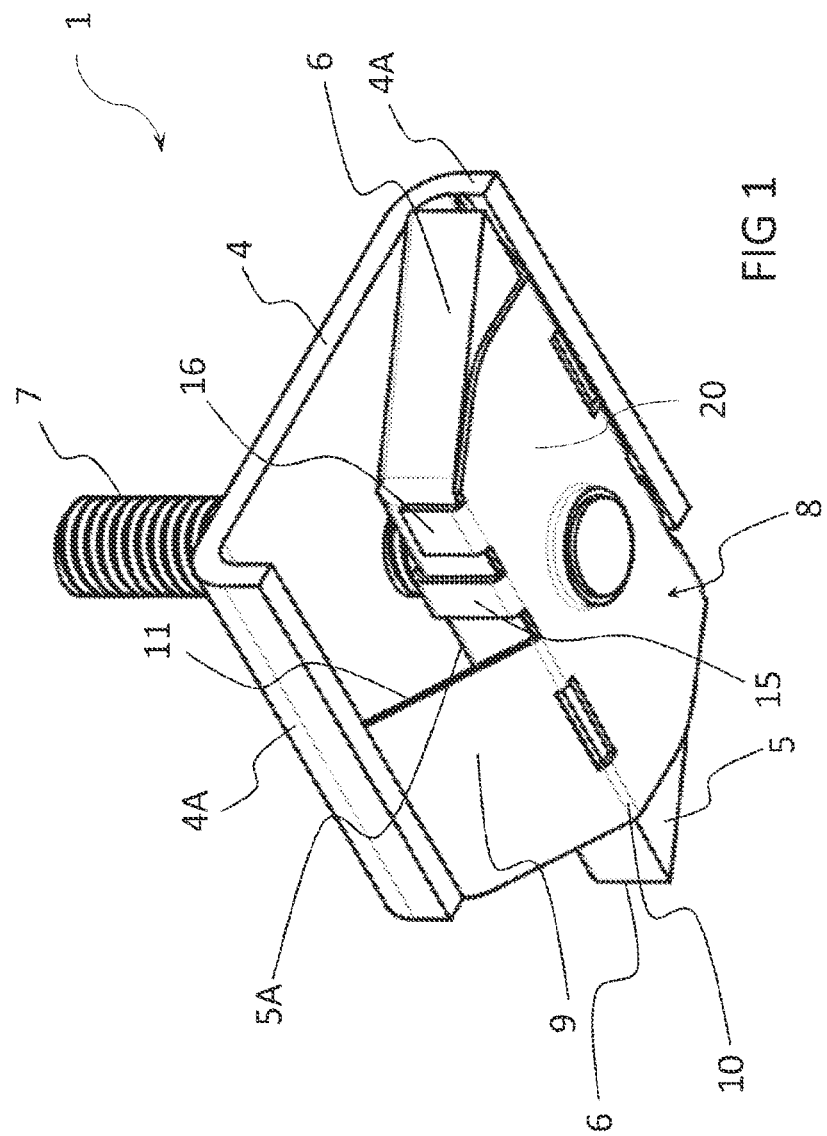

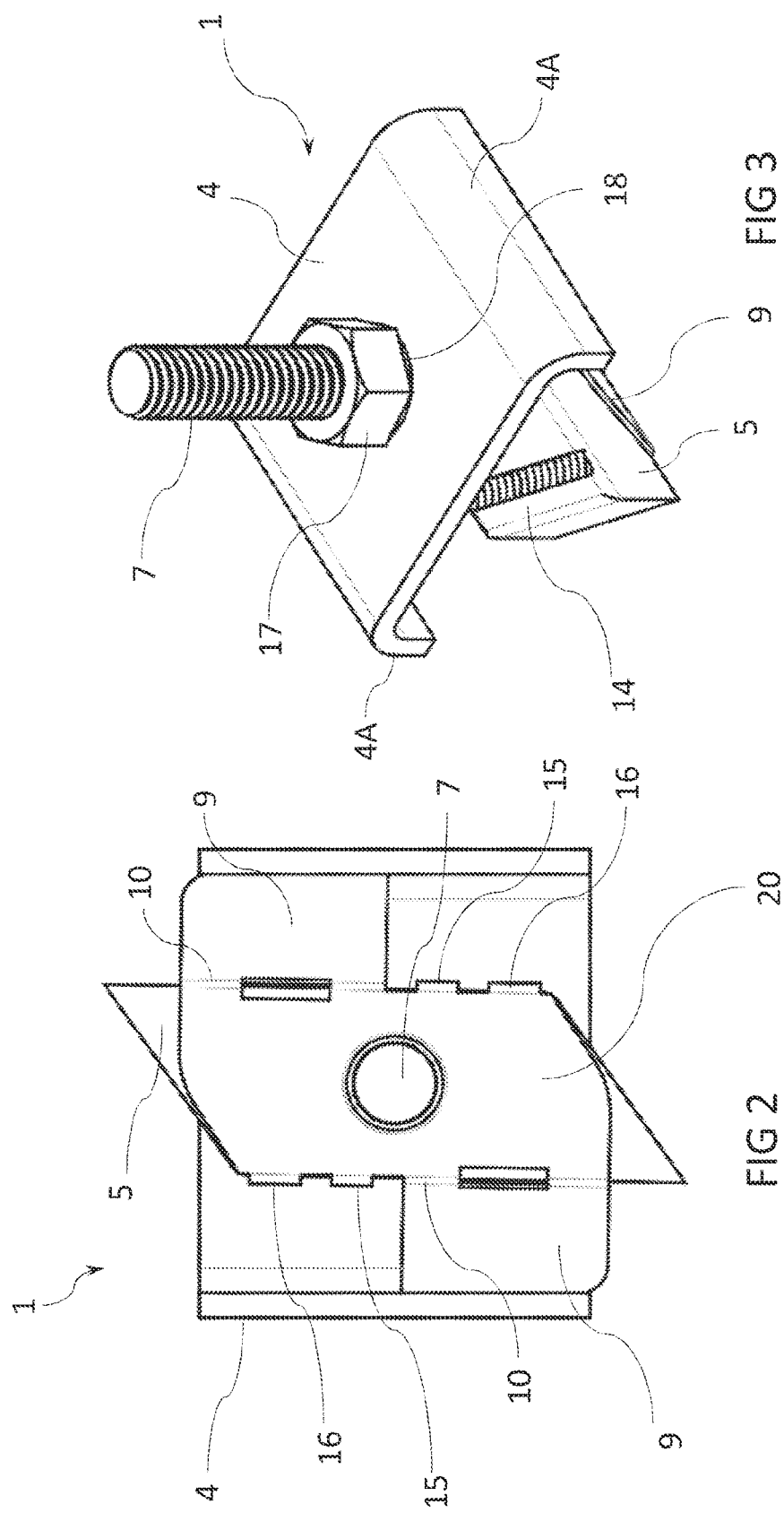

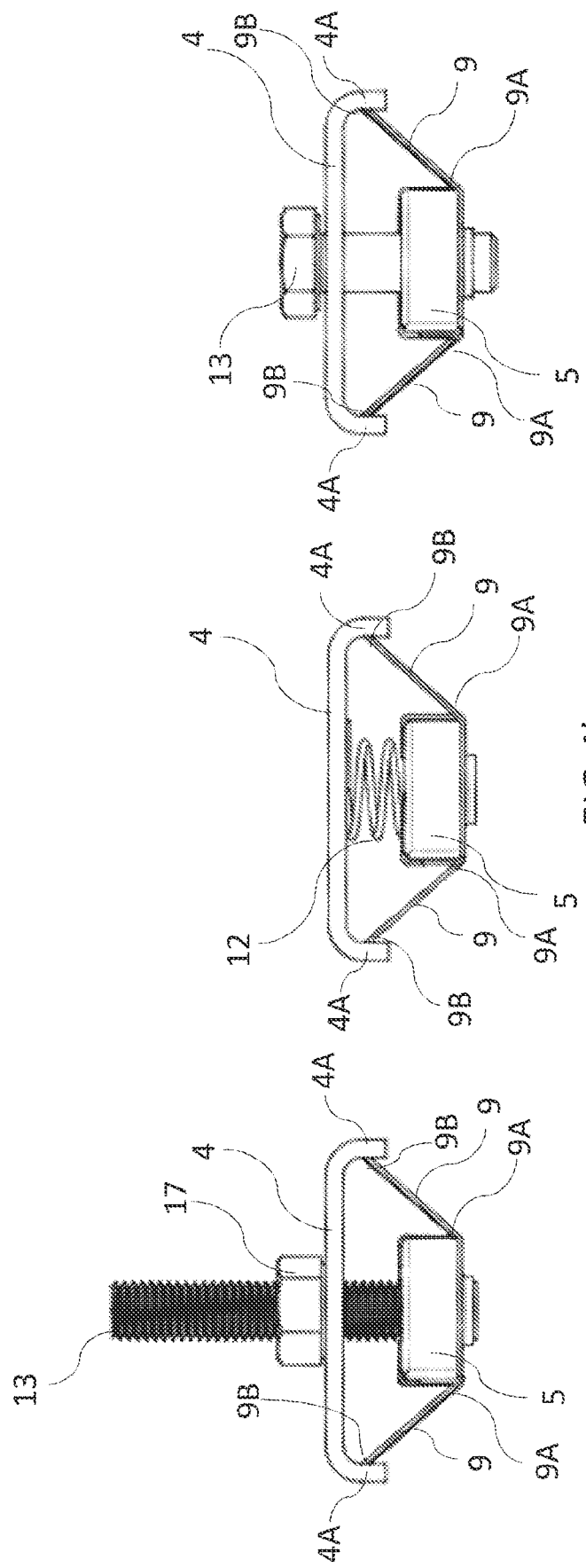

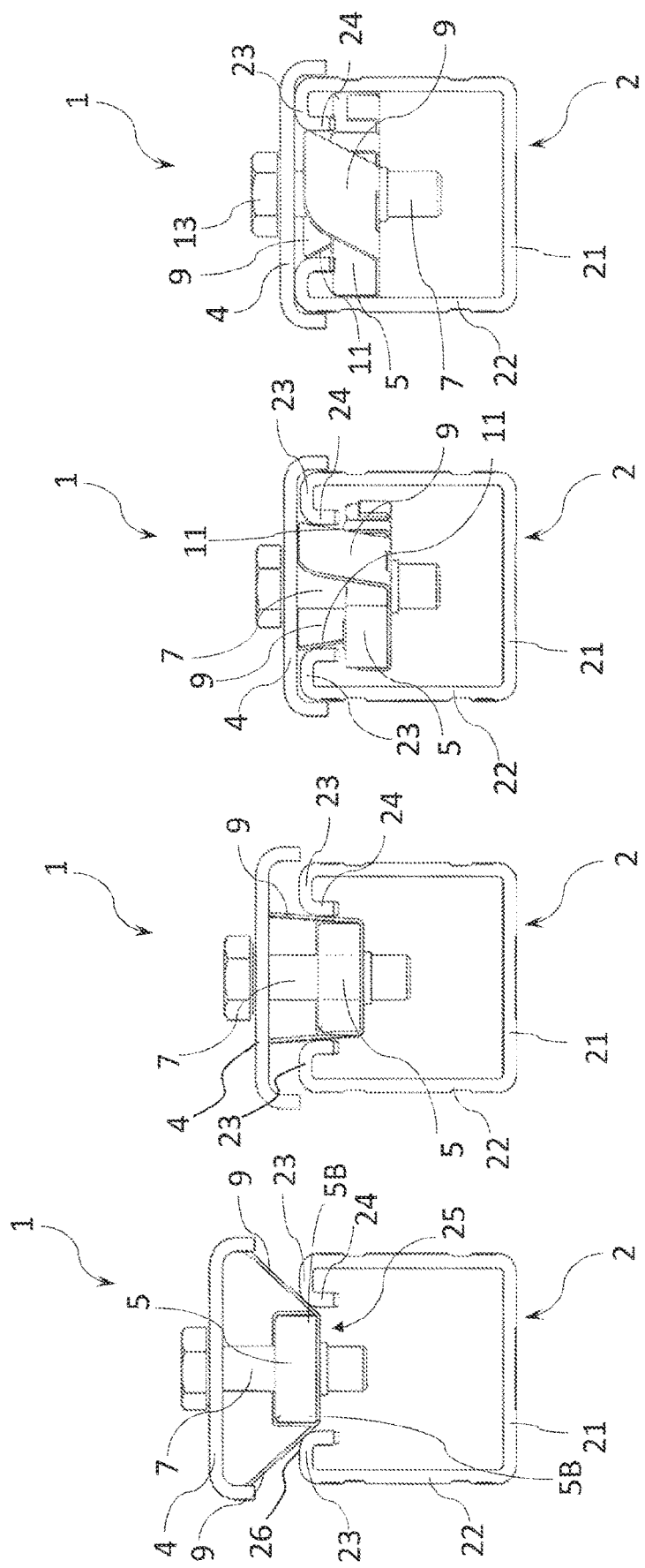

CHANNEL FASTENER WITH TORQUE INDUCING ELEMENT

BACKGROUND

Technical Field of the Invention

The present invention relates to a channel fastener for fastening an object to an elongate channel element, said channel element having a bottom, an upper side opposite the bottom and lateral walls that interconnect the upper side and the bottom, wherein the upper side includes flanges that extend from the lateral walls towards each other and a longitudinal slot defined between the flanges and having a slot width.

Description of Related Art

Channel fasteners for fastening an object to an elongate channel element are known. They are generally made of a washer element, an anchoring element and a connecting element in between the washer element and the anchoring element. The anchoring element has an elongate shape that allows for insertion into the channel element, and that makes it impossible to retract it when it is rotated in the channel element to a locking position, in which it is misaligned with the slot. The washer element has a shape that allows it to rest on the upper side of the flanges of the channel element both before and after the rotation of the anchoring element.

Within the field of channel fasteners there is a type of channel fasteners in which the anchoring element is automatically rotated to a locked position when the anchoring element is inserted through the longitudinal slot of the channel element. The present invention relates to such a channel fastener.

In particular the present invention relates to a channel fastener of the type comprising:
- a rigid washer element, which has a bearing face that is arranged for resting against the outer side of the flanges of the channel element;
- an oblong metal anchoring element having a width smaller than the slot width and a length larger than the slot width, said anchoring element being located on the side of the washer element where the bearing face is located and has longitudinal end portions adapted to engage an inner side of the respective flanges of the channel element in a locking position of the anchoring element;
- a connecting element which connects the anchoring element to the washer element, while allowing the anchoring element to rotate with respect to the washer element, in such a way that while holding the washer element the fastener with its oblong anchoring element can be aligned with the longitudinal slot and the anchoring element can be inserted through the longitudinal slot into the channel element, and that subsequently after a rotation of the anchoring element, the anchoring element is in a locking position, in which it extends at an angle relative to the longitudinal slot; and
- a torque-inducing element fixed to the anchoring element, the torque-inducing element including at least one resiliently deformable limb arranged substantially offset from the rotational axis of the anchoring element and adapted for a sliding engagement with at least one of the flanges of the channel element, such that when the anchoring element is inserted through the longitudinal slot into the channel element, said limb deforms to pass the flange while sliding along the flange towards the interior of the channel element, whereby a torque on the anchoring element is induced, so as to rotate the anchoring element in the channel element, whereby it is brought in the locking position in which it cannot be retracted through the longitudinal slot.

In this type of channel fastener the translational movement of the fastener is converted into the rotational movement by the torque inducing element. The channel fastener can be installed into several types of channel elements, such as a strut rail or a mounting rail with a C-shaped cross section.

EP 1 357 304 A1 discloses a channel fastener having an anchoring element, a washer element and a torque-inducing element. The washer element is formed as an L-shaped bracket which is connected to the anchoring element by a bolt. The torque-inducing element is arranged on top of the anchoring element and comprises a central ring and curved spring arms which are attached to the central ring on diametrically opposite locations and are arranged in a point symmetrical way. When the anchoring element is pushed into the longitudinal slot of a corresponding channel element, the curved spring arms slide along the edges of the slot and will induce an automatic rotation of the anchoring element. In the locked position of the anchoring element, in which the anchoring element engages the inside of the flanges of the channel element, the spring arms will still engage an outside of the flanges.

DE 100 36 478 A1 discloses a channel fastener comprising an anchoring element and a torque-inducing element which is arranged on an upper side of the anchoring element. The torque-inducing element includes a plate which is arranged and attached to the upper side of the anchoring element and wings attached to the longitudinal ends of the plate and lying in the same plane as the plate. When the anchoring element is pushed in the slot of the channel element the wings engage the upper side of the flanges of the channel element and elastically deform thereby causing an automatic rotation of the anchoring element towards the locked position. When the anchoring element is in the locked position underneath the flanges of the channel element, the wings engage the outside of the flanges and retain the assembly in a pre-mounting state on the flanges of the channel element. The anchoring element has a threaded bore such that further elements such as a threaded male fastener, a nut and a washer can be mounted to the anchoring element.

EP 0 837 256 B1 discloses a similar channel fastener as DE 100 36 478. Also in this channel fastener the torque inducing element includes a plate which is arranged and attached to a lower side of the anchoring element and two arcuate elastically deformable lugs attached to the longitudinal ends of the plate. The arcuate lugs are curved out of the plane of the plate. When the anchoring element is pushed in the slot of the channel element, the arcuate lugs engage the edge between the upper side of the flanges and the slot of the channel element and elastically deform, thereby causing an automatic rotation of the anchoring element towards the locked position. The arcuate lugs have bent end portions which engage the upper side of the flanges of the channel element and retain the assembly in a pre-mounting state on the flanges of the channel element when the anchoring element is rotated into the locked position underneath the flanges of the channel element.

An object of the invention is to provide a channel fastener having a more compact design.

SUMMARY OF THE INVENTION

This object is achieved by a channel fastener for fastening an object to an elongate channel element, said channel element having a bottom, an upper side opposite the bottom and lateral walls that interconnect the upper side and the bottom, wherein the upper side includes flanges that extend from the lateral walls towards each other and a longitudinal slot defined between the flanges and having a slot width, wherein the fastener comprises:

a rigid washer element, which has a bearing face that is arranged for resting against the outer side of the flanges of the channel element;
   an oblong metal anchoring element having a width smaller than the slot width and a length larger than the slot width, said anchoring element being located on the side of the washer element where the bearing face is located and has longitudinal end portions adapted to engage an inner side of the respective flanges of the channel element in a locking position of the anchoring element;
   a connecting element which connects the anchoring element to the washer element, while allowing the anchoring element to rotate with respect to the washer element, in such a way that while holding the washer element the fastener with its oblong anchoring element can be aligned with the longitudinal slot and the anchoring element can be inserted through the longitudinal slot into the channel element, and that subsequently after a rotation of the anchoring element, the anchoring element is in a locking position, in which it extends at an angle relative to the longitudinal slot; and
   a torque-inducing element fixed to the anchoring element, the torque-inducing element including at least one resiliently deformable limb arranged substantially offset from the rotational axis of the anchoring element and adapted for a sliding engagement with at least one of the flanges of the channel element, such that when the anchoring element is inserted through the longitudinal slot into the channel element, said limb deforms to pass the flange while sliding along the flange towards the interior of the channel element, whereby a torque on the anchoring element is induced, so as to rotate the anchoring element in the channel element, whereby it is brought in the locking position in which it cannot be retracted through the longitudinal slot;
wherein the at least one resiliently deformable limb in an initial state extends from the anchoring element towards the washer element, wherein the resiliently deformable limb has a proximal end located at the anchoring element and a distal end located adjacent or against the washer element.

The resiliently deformable limb or limbs of the channel fastener according to the invention extend(s) from the anchoring element towards the washer element and thereby stay(s) within the contour of the washer element. This provides a more compact design of the channel fastener compared to the known channel fasteners.

In a possible embodiment of the channel fastener the washer element has at least one bent edge portion, which in a mounted state engages over one of the upper edges of the channel element, such that when the washer element is placed on the flanges of the channel element a rotation of the washer element relative to the channel element is blocked.

Preferably, the distal end of the at least one resiliently deformable limb engages, in the initial state, the washer element at an inner side of the at least one bent edge portion. This provides a further compactness of the design of the channel fastener, because the limb is retained within the contour by the bent edge. Furthermore, the distal end of the limb is shielded by the bent edge portion of the washer which reduce the risk of damage or dislocation of the limb with respect to the other components of the channel fastener.

The washer element may have two opposite bent edge portions which in a mounted state engage over the upper edges of the channel element, such that when the washer element is placed on the flanges of the channel element a rotation of the washer element relative to the channel element is blocked. In such an embodiment the torque-inducing element preferably comprises two resiliently deformable limbs, placed rotationally symmetric with respect to the rotational axis of the anchoring element, wherein the distal ends of the respective limbs engage the washer element at the opposite bent edge portions. By using two limbs instead of one, the force resulting from the deformation of the limbs is applied to both sides of the anchoring element. Advantageously, the torque on the anchoring element is larger than when using one limb, and there is no or very little resulting lateral force on the anchoring element, whereby the user can more easily push the channel fastener straight into the channel element.

In a further embodiment of the channel fastener the torque-inducing element comprises a support plate which has a surface matching to the side of the anchoring element facing away from the washer element, and at least two gripping fingers connected to longitudinal edges of the support plate adapted to fit around the anchoring element to keep the torque-inducing element located against the anchoring element, wherein the torque-inducing element is made immobile with respect to the anchoring element, and wherein the two resiliently deformable limbs are connected with their proximal ends to the longitudinal edges of the support plate, and are placed radially symmetric with respect to the rotational axis of the support plate. Preferably the torque-inducing element is produced as one piece, preferably from sheet metal or plastic.

The known channel fasteners of EP 1357304 A1, DE 100 36 478 A1 and EP 0 837 256 B1 all have the disadvantage that the torque-inducing elements have parts that remain on the outside of the flanges of the channel element when the anchoring element is in the locking position on the inside of the flanges. This means that when the washer element and the anchoring element are tightened together by a threaded fastener, e.g. a bolt, or a threaded rod/nut combination, said parts of the torque inducing elements will get nipped between the outside of the flange and the washer element. This may cause a less defined clamping force and a less sturdy connection between the channel fastener and the channel element.

In a preferred embodiment of the channel fastener according to the invention the torque inducing element is configured and arranged on the anchoring element in such a way that, when the anchoring element is in its locking position in the channel element, the at least one limb extends with the distal end thereof into the longitudinal slot between the flanges of the channel element. This embodiment thus does not have the disadvantage of parts getting nipped between the washer and the flanges.

The elements of the channel fastener can for example be made of metal or plastic. In a preferred practical embodiment, the washer, torque-inducing and anchoring elements are made of metal.

In a possible embodiment, the resiliently deformable limb is formed as a wing, wherein the wing is extending from a longitudinal edge of the anchoring element, and wherein the resilient deformation of the wing takes place substantially at the longitudinal edge of the anchoring element. A wing can for example be a flexible plate, which is folded about an edge of the anchoring element, when the anchoring element is inserted between the flanges of the channel element. When using a wing, the deformation substantially takes place over a line or a linear strip. This ensures that the deformation will mostly occur around an axis through this line or strip, which makes the deformation more robust than when using a smaller limb, where a deformation in the wrong direction may occur, for example during transportation or packaging.

In a further embodiment, the wing has a quadrilateral shape, preferably rectangular, possibly with one or more rounded corners, positioned along at most one half of the longitudinal edge of the anchoring element and entirely offset from the rotational axis of the anchoring element. In the case that the wing is entirely offset from the rotational axis, the side of the wing that slides past the flanges, when the anchoring element passes the flanges, is on the same side of the rotational axis as the wing itself. This side of the rotational axis is where the torque is applied. If it would be on the other side of the rotational axis, it would reverse the rotation of the anchoring element, and the wings would block further rotation with their position against the flanges. The anchoring element provided with rectangular wings can rotate when the entire wing is offset from the rotational axis.

In another embodiment, the wing has a longitudinal edge and a transverse edge, wherein the longitudinal edge of the wing is positioned along or parallel to the longitudinal edge of the anchoring element, wherein the transverse edge is oblique with respect to the longitudinal edge, wherein the transverse edge slides along the flange of the channel element when the anchoring element is inserted through the longitudinal slot into the channel element. When the transverse edge is oblique with respect to the longitudinal edge, and thus with the longitudinal edge of the anchoring element, the contact point of the transverse edge with the flanges will move away from the edge of the anchoring element, and the resultant force on the anchoring element will move with respect to the rotational axis, resulting in an increasing torque as the anchoring element moves further down. This has the additional advantage that the longitudinal edge of the wing, which is positioned along the longitudinal edge of the anchoring element, can be longer than half of the longitudinal edge of the anchoring element, as long as the angle with the transverse edge is such that the contact point between the transverse edge and the flanges is and remains on one side of the rotational axis when the anchoring element has passed the flanges while moving down into the channel element. If this is the case, the torque on the anchoring element begins countering the desired rotation of the anchoring element, until the contact point between the transverse edge and the flanges passes the axis by the downward motion of the anchoring element. After this point, the torque is working towards the desired rotation of the anchoring element. This works if the reversal of the torque occurs before the anchoring element has passed the flanges and is free to rotate.

In a further embodiment of the invention, the connecting element is adapted to vary the distance between the washer element and the anchoring element, whereby the channel fastener can be clamped on the flanges of the channel element after the anchoring element has rotated in the anchoring element. By decreasing the distance between the two elements, they are each forced against the flanges, and the channel fastener becomes immobile in the channel element. When it is fastened, it can be used for, for example, installing other parts to the channel element, such as pipe clips.

In a possible embodiment of the channel fastener according to the invention the connecting element is adapted to vary the distance between the washer element and the anchoring element, whereby the channel fastener can be clamped on the flanges of the channel element after the anchoring element has rotated in the anchoring element.

The connecting element may comprises a spring, fixedly attached to the washer element on one end and fixedly attached to the anchoring element on the other end, wherein the spring is adapted to provide an axial and a rotational spring force.

The connecting element may also comprise a male threaded fastener attached to the anchoring element, passing through a hole in the washer element in which it is freely rotatable, wherein the channel fastener can be clamped on the flanges of the channel element by fastening a nut to the male threaded fastener which tightens the washer element and the anchoring element around the flanges.

The connecting element may alternatively comprises a bolt, passing through a hole in the washer element in which it is freely rotatable and mating with a threaded hole in the anchoring element, wherein the channel fastener can be clamped on the flanges of the channel element by rotating the bolt, whereby the anchoring element and the washer element are tightened around the flanges.

The above-mentioned embodiments allow the clamping of the washer element and the anchoring element onto the flanges by moving the two elements closer together. Also, they each allow the rotation of the two elements with respect to each other, so the anchoring element can rotate into the locking position. In the case of the spring, this is allowed by a weak rotational spring.

In a possible embodiment, the washer is formed as a joining member for connecting two channel elements and has a bearing face that is arranged for resting against the outer side of the flanges of two channel elements, and two anchoring elements are connected to this washer element with the use of two connecting elements, whereby the channel fastener is adapted to join two channel elements with respect to each other. This is most often used when two channel elements are placed at a right angle, but may also be used for connecting two channel elements in line with each other. By using a joining member, the channel elements can be joined together in a releasable manner. Additionally, it is possible to mount the end of one channel element anywhere on another channel element, without structural changes to the channel elements.

The invention also involves a combination of a channel fastener according to any of the above described embodiments and a channel element having a bottom, an upper side opposite the bottom and lateral walls that interconnect the upper side and the bottom, wherein the upper side includes flanges that extend from the lateral walls towards each other and a longitudinal slot defined between the flanges and having a slot width. In a possible practical embodiment, the channel element is a strut rail. The combination of the channel fastener and the channel element allows for the installation of other parts to the channel element, for fixing parts in a specified location and other installation purposes. A channel fastener made to match a specific channel element is advantageous, because the washer element and anchoring element can be formed in such a way that they exactly fit on the channel element and the flanges, for example with grooves in which the flanges can be located in the locking position in case of a strut rail.

The invention also involves a method for using a channel fastener according to any of the described embodiments, wherein the method comprises the following steps:

- the channel fastener is positioned above the channel element, with the longitudinal axis of the anchoring element aligned with the longitudinal slot of the channel element;
- the anchoring element is lowered into the longitudinal slot of the channel element, whereby the at least one limb of the torque-inducing element of the channel fastener comes into contact with a flange of the channel element;
- force is applied to the channel fastener to further lower the anchoring element into the longitudinal slot of the channel element, whereby the at least one limb of the torque-inducing element is deformed;
- the anchoring element is lowered into the longitudinal slot until it passes beyond the flanges of the channel element, at which point the anchoring element is provided with space for rotation with respect to the flanges inside the channel element, and the deformation of the at least one limb of the torque-inducing element and the resulting torque on the anchoring element causes the anchoring element to rotate into the channel element, whereby the anchoring element is brought in the locking position in which it cannot be moved through the longitudinal slot.

This method allows for quick and easy installation by the user, where the user only needs to position the channel fastener and push the anchoring element into the channel. A following step is then to tighten the anchoring element and the washer around the flanges.

The invention will be further elucidated in the following detailed description with reference to the drawings.

BRIEF DESCRIPTION OF THE DRAWINGS

FIG. 1 shows an embodiment of a channel fastener according to the invention, having a threaded connecting element in isometric view from below, FIG. 2 shows a bottom view of the channel fastener of FIG. 1, FIG. 3 shows the channel fastener of FIG. 1, in isometric view from above, FIG. 4a shows a side elevational view of the channel fastener of FIG. 1, FIG. 4b shows a side elevational view of another embodiment having a spring as a connecting element, FIG. 4c shows a side elevational view of another embodiment having a bolt as a connecting element, and FIGS. 5a-5d shows the channel fastener of FIG. 4c in different stages as it is inserted into the channel element.

DETAILED DESCRIPTION

In FIGS. 1-4a a channel fastener 1 is shown which comprises a washer element 4, an anchoring element 5 and a connecting element 7. The channel fastener 1 is adapted to be connected to a channel element 2, as is illustrated in FIG. 5a-5d.

The channel element 2 can be any type of channel element, such as a strut rail or a mounting rail having a C-shaped cross section. As can be seen in FIG. 5a the channel element has a bottom 21, lateral walls 22 and flanges 23 extending from the lateral walls. The bottom 21, walls 22 and flanges 23 extend in longitudinal direction. A longitudinal slot is 25 defined between the flanges 23. Optionally, the flanges 23 include an inwardly bent flange portion 24 that extend from an upper flange portion 26 towards the bottom 21 of the channel element. A strut rail has typically such inwardly bent flange portions 24 as is shown in FIGS. 5a-5d.

The washer element 4 is designed to bear on an upper side of the flanges 23 of channel element 2. It is in the shown embodiment a rectangular plate, but may be any suitable shape. The dimensions of the washer element 4 should be such that the washer element 4 cannot be lowered into the channel element 2 through the longitudinal slot 25. In the specific embodiment shown in the figures, the washer element 4 has two opposite bent edges 4A which in a mounted state engage over the upper edges of the channel element 2, such that when the washer element 4 is placed on the flanges 23 its rotation is blocked. The washer element 4 has a passage 18 at a central location, through which a connecting element 7 or other element may be passed. The washer element 4 is preferably made of metal.

The anchoring element 5 is an elongate element which has longitudinal and transversal dimensions adapted to fit through the longitudinal slot 25 when the longitudinal axis of the anchoring element 5 is aligned with the longitudinal slot 25 between the flanges 23 of the channel element 2. The anchoring element is preferably made of metal, e.g. steel. By rotation of the longitudinal axis of the anchoring element 5 and misalignment thereof with the slot 25 of the channel element 2 after the anchoring element 5 is passed between the flanges 23 into the interior of the channel element 2, the anchoring element 5 is brought into a locking position whereby the channel fastener 1 is fastened to the channel element 2. The anchoring element 5 must therefore be longer in longitudinal direction than the longitudinal slot 25 is wide, but smaller in transverse direction. Additionally, the anchoring element 5 must be adapted to be connected to the connecting element 7. For this purpose, it may have a passage at a central area of the anchoring element 5 through which the connecting element 7 can be passed. In particular it may have a threaded bore to receive a male threaded fastener such as a bolt or a threaded rod, in which case the anchoring element is actually a nut. However, other means of connecting the anchoring element 5 to the connecting element 7 are also possible.

As is shown in FIGS. 1, 2 and 3, the anchoring element has end portions 6, seen in longitudinal direction, which end portions 6 extend non-perpendicularly with respect to the longitudinal axis of the anchoring element 5. This angle ensures that the end portions 6 engage the walls 22 of the channel element 2 when the anchoring element 5 is in locking position, and that the anchoring element 5 cannot rotate further than this locking position. The anchoring element 5 may however also be rectangular.

The connecting element 7 is adapted to connect the washer element 4 and the anchoring element 5, allowing the anchoring element 5 to rotate with respect to the washer element 4, in such a way that the anchoring element 5 can be brought into the interior of the channel element 2 and rotate therein to the locking position. It may also be used to keep the anchoring element 5 and the washer element 4 spaced on a distance or to decrease the distance between the elements 4 and 5 to tighten them onto the flanges 3.

FIG. 4 shows three possible connecting elements. In these embodiments, the connecting elements are used to tighten the anchoring element 5 and washer element 4 on the flanges 3, which immobilizes the channel fastener 1 with respect to the channel element 2.

FIG. 4a, like FIGS. 1-3, shows a channel fastener 1, wherein the connecting element 7 is a threaded rod 13. The threaded rod 13 passes through the passage 18 in the washer element 4, able to rotate freely therein. The threaded rod 13 is connected to the anchoring element 5 and/or the torque inducing element 8, rotationally fixed with respect to at least one of these. The channel fastener 1 can be tightened using a nut 17 arranged on the threaded rod 13 above the washer element 4. Other elements may be connected to the threaded rod 13 above this nut 17.

FIG. 4b shows a channel fastener 1 including a spring 12 as the connecting element. The spring 12 is fixedly attached to the washer element 4. It is also fixedly attached to either or both of the anchoring element 5 and the torque inducing element 8. When the anchoring element 5 is rotated into locking position, the spring 12 deforms both in length and over the rotation axis. The deformation in length causes a spring force which pulls the anchoring element 5 and washer element 4 together and thus clamps the channel fastener 1 on the channel element 2. The clamping of the fastener on the flanges of the channel element is in particular in a pre-mounting state. The channel fastener 1 may in addition be combined with a threaded male fastener, such as a bolt, or a threaded rod with a nut, which engages the washer 4 from above. The male threaded fastener is then used to tighten the anchoring element 5 and the washer element 4 on the flanges 23 and fix the channel fastener 1 on the channel element 2.

FIG. 4c shows a channel fastener 1 with a bolt 13 as the connecting element. The bolt 13 passes through the passage 18 in the washer element 4, able to rotate freely therein. The threaded end of the bolt shank 13 is inserted into a matching threaded bore in the anchoring element 5. The channel fastener 1 is tightened onto the channel element 2 by rotating the bolt 13 with respect to the anchoring element 5. This type is for example used for channel fasteners 1 which join two channel elements 2 together, and do not attach any other elements to the channel element 2.

The channel fastener 1 furthermore includes a torque-inducing element 8. The torque-inducing element 8 has two limbs 9 in the shown embodiment. The torque-inducing element 8 may, however, also have another number of limbs 9. The limbs 9 are parts extending from the main body of the torque-inducing element 8. The main body is in the embodiment shown in the figures formed as a plate 20 as will be described further down. In FIGS. 1 and 2, the limbs 9 are formed as rectangular wings, but they may also have another shape, such as extending pins.

The limbs 9 are resiliently deformable, and deform when the anchoring element 5 is inserted into the channel element 2. This deformation preferably takes place substantially at a proximal end 9A thereof which is at the location where the limbs 9 are joined to the main body of the torque-inducing element 8. In the case of a wing, this location is a hinge line 10, which acts as a hinge with a spring behaviour due to it being resiliently deformable. This deformation causes a spring force, which results in a torque on the anchoring element 5, by which the anchoring element 5 rotates in the interior of the channel element 2, until it is in the locking position.

In this embodiment, a slot-like recess or opening 19 is present in the hinge line 10 of the wing 9, where the torque-inducing element 8 deforms during insertion into the channel element 2. Because material is removed in the area of deformation, the bending stiffness at the hinge line 10 is reduced. This ensures that the deformation occurs at the hinge line 10, and not on the entire surface of the wing 9, as is indicated in FIGS. 5a-d. It also means less force is required to deform the torque-inducing element 8 and thus to enter the channel fastener 1 into channel element 2.

In the embodiment shown in the figures, the main body of the torque-inducing element 8 comprises a base plate 20 which is placed against the anchoring element 5, on a side that faces away from the washer element 4. The base plate 20 is attached to the anchoring element 5 with gripping fingers 15 which grip around the longitudinal sides of the anchoring element 5. FIGS. 1 and 2 show a gripping finger 15 on each side of the anchoring element 5, which has a bent edge which engages over an upper edge 5A of the anchoring element 5. Additionally, a gripping limb 16 is present on each side, to provide additional grip and resilience against rotation. Other means of attachment and the use of more gripping fingers 15 or more gripping limbs 16 are also possible.

In an initial unloaded state the resiliently deformable limbs 9 extend from the hinge line 10, which is located at an lower longitudinal edge of the anchoring element 5 towards the washer element 4. In this initial unloaded state the resiliently deformable limbs 9 have a distal end 9B located against an inner side of the bent edge portions 4A of the washer element 4, as can be seen in FIGS. 1, 2, 4a-4c and 5a. This provides a compact design to the channel fastener 1, because the limbs 9 are retained within the contour by the bent edges 4A of the washer element. Furthermore, the distal ends of the limbs 9 are shielded by the respective bent edge portions 4A of the washer element 4 which reduce the risk of damage or dislocation of the limbs 9 with respect to the other components 4, 5 of the channel fastener 1.

The torque-inducing element 8 can for example be made from spring steel or plastic, but other materials are also possible, when they allow for the resilient deformation of the wings 9. It may be produced as one piece, preferably from a metal sheet, but it may also consist of multiple parts. In another possible embodiment the torque inducing element is a one-piece injection moulded part made of a suitable plastic.

FIG. 3 also shows the channel fastener 1. Here, the anchoring element 5 is shown to have a grip-providing surface portion 14. When the anchoring element 5 is in the locking position, the respective grip providing surface portions 14 engage the edge of the bent portion 24 of the respective flanges 23 of the channel element 2. This increases the grip between the two surfaces, whereby the anchoring element 5 and the channel element 2 are less likely to move with respect to each other. The specific groove-like surface portion 14 in this figure is typical for anchoring elements 5 used with strut rails.

FIG. 5 shows the process of mounting the channel fastener 1 to the channel element 2 in four steps.

FIG. 5a shows that the anchoring element 5 of the channel fastener 1 is aligned with the slot 25 between the flanges 23 of the channel element 2. The anchoring element 5 is not rotated yet and fits in the longitudinal slot in between the flanges 23. The torque-inducing element 8 is not yet deformed, and is unloaded in this state.

FIG. 5b shows that the channel fastener 1 is lowered through the slot towards the interior of the channel element 2, for example by pushing on the washer element 4 or the connecting element 7. As the anchoring element 5 moves into the channel element 2, the limbs 9 of the torque-inducing element 8 engage the flanges 23 of the channel element 2 and bend along the hinge line 10 near the lower longitudinal edge 5B of the anchoring element 5. The limbs 9 are pushed against anchoring element 5, while the anchoring element 5 is further lowered. As of yet, there is no rotation of the anchoring element 5, because this is still blocked by the bent flange portions 24.

FIG. 5c shows that when the anchoring element 5 has passed the inwardly bent flange portions 24, the wings 9 can start returning to their original shape or position driven by the resilient deformation over the hinge line 10. As the anchoring element is lowered, the inner edge 11 of the respective wings 9 slides past the flange portions 24, pushing against the flange portions 24 as the wings 9 seek to return to their original shape. By this, the two wings 9 exert a torque on the anchoring element 5, which initiates the rotation of the anchoring element 5 in the channel element 2. Meanwhile, the washer element 4 does not rotate, and is close to or bearing against the upper side of the flanges 23.

FIG. 5d shows the anchoring element 5 in the locking position, wherein the limbs 9 have completely returned to their original unloaded state, and the longitudinal end portions 6 of the anchoring element are in contact with the side walls 22 of the channel element 2. The limbs 9 extend with their free distal end portion into the slot 25 between the bent portions 24 of the flanges 23, as can be clearly seen in FIG. 5d. The limbs 9 are in this state still located underneath the washer element 4 and the distal ends of the limbs 9 are spaced apart from an underside of the washer element 4 as can be seen in FIG. 5d. The limbs 9 are thus not in the way of other parts that have to be mounted to the channel fastener 1. When the anchoring element 5 is in this locking position, the channel fastener 1 may be tightened on the channel element 2, by tightening the connecting element 7, in the example of FIGS. 5a-5d a bolt 13, or in case it is a threaded rod 13 and nut 17, by tightening the nut 17. The limbs 9 do not get nipped between the underside of the washer element 4 and the flanges 23 when the washer and anchoring element are tightened together by the bolt 13 or the threaded rod 13 and nut 17.

The invention claimed is:

1. A channel fastener for fastening an object to an elongate channel element having a longitudinal slot defined between flanges,
    wherein the channel fastener comprises:
        a rigid washer element, having a bearing face;
        an oblong metal anchoring element having a width and a length, wherein the width is smaller than the length, said anchoring element being located on the side of the washer element where the bearing face is located and having longitudinal end portions;
        a connecting element which connects the anchoring element to the washer element, while allowing the anchoring element to rotate with respect to the washer element, wherein-after a rotation of the anchoring element, the anchoring element is in a locking position; and
        a torque-inducing element fixed to the anchoring element, the torque-inducing element including at least one resiliently deformable limb arranged substantially offset from a rotational axis of the anchoring element, wherein the at least one resiliently deformable limb in an initial state extends from the anchoring element towards the washer element, wherein the resiliently deformable limb has a proximal end located at the anchoring element and a distal end located against the washer element, and wherein the resiliently deformable limb is adapted for a sliding engagement with at least one of the flanges of the channel element, such that said limb is configured to deform as it passes the flange, by which deformation a torque on the anchoring element is induced, so as to rotate the anchoring element towards the locking position.

2. The channel fastener according to claim 1, wherein the washer element has at least one bent edge portion, and wherein, in the initial state, the distal end of the at least one limb engages the washer element at an inner side of the at least one bent edge portion.

3. The channel fastener according to claim 1, wherein the washer element has two opposite bent edge portions, and wherein the at least one resiliently deformable limb of the torque-inducing element comprises two resiliently deformable limbs, placed rotationally symmetric with respect to the rotational axis of the anchoring element, wherein the distal ends of the respective limbs engage the washer element at the opposite bent edge portions.

4. The channel fastener according to claim 3, wherein the torque-inducing element comprises a support plate which has a surface matching to a side of the anchoring element facing away from the washer element, and at least two gripping fingers connected to longitudinal edges of the support plate adapted to fit around the anchoring element to keep the torque-inducing element located against the anchoring element, wherein the torque-inducing element is made immobile with respect to the anchoring element, and wherein the two resiliently deformable limbs are connected with their proximal ends to the longitudinal edges of the support plate, and are placed radially symmetric with respect to the rotational axis of the support plate.

5. The channel fastener according to claim 4, wherein the torque-inducing element is produced as one piece.

6. The channel fastener according to claim 1, wherein the resiliently deformable limb is formed as a wing, wherein the wing is extending from a longitudinal edge of the anchoring element, and wherein the resilient deformation of the wing takes place substantially around the longitudinal edge of the anchoring element.

7. The channel fastener according to claim 6, wherein the wing has a quadrilateral shape, positioned along at most one half of the longitudinal edge of the anchoring element and entirely offset from the rotational axis of the anchoring element.

8. The channel fastener according to claim 6, wherein the wing has a longitudinal edge and a transverse edge, wherein the longitudinal edge of the wing is positioned along the longitudinal edge of the anchoring element, wherein the transverse edge is oblique with respect to the longitudinal edge, wherein the transverse edge is configured to slide along the flange of the channel element when the anchoring element is inserted through the longitudinal slot into the channel element.

9. The channel fastener according to claim 1, wherein the torque inducing element is configured and arranged on the anchoring element in such a way that, when the anchoring element is in its locking position in the channel element, the at least one limb extends with the distal end thereof into the longitudinal slot between the flanges of the channel element.

10. The channel fastener according to claim 1, wherein the connecting element is adapted to vary the distance between the washer element and the anchoring element, thus configuring the channel fastener to be clamped on the flanges of the channel element after the anchoring element has rotated in the channel element.

11. The channel fastener according to claim 10, wherein the connecting element comprises a spring, fixedly attached to the washer element on one end and fixedly attached to the anchoring element on the other end, wherein the spring is adapted to provide an axial and a rotational spring force.

12. The channel fastener according to claim 10, wherein the connecting element comprises a male threaded fastener attached to the anchoring element, passing through a hole in the washer element in which it is freely rotatable, wherein the channel fastener is configured to be clamped on the flanges of the channel element by fastening a nut to the male threaded fastener which is configured to tighten the washer element and the anchoring element around the flanges.

13. The channel fastener according to claim 10, wherein the connecting element comprises a bolt, passing through a hole in the washer element in which it is freely rotatable and mating with a threaded hole in the anchoring element, wherein the channel fastener can be clamped on the flanges of the channel element by rotating the bolt, whereby the anchoring element and the washer element are configured to be tightened around the flanges.

14. The channel fastener according to claim 1, wherein the washer element is formed as a channel-connector body, and wherein an additional anchoring element is connected to the washer element with the use of an additional connecting element, whereby the channel fastener is adapted to fasten two channel elements with respect to each other.

15. A combination of a channel fastener and a channel element, the channel element having a bottom, an upper side opposite the bottom and lateral walls that interconnect the upper side and the bottom, wherein the upper side includes flanges that extend from the lateral walls towards each other and a longitudinal slot defined between the flanges and having a slot width, and
the channel fastener comprising:
a rigid washer element, which has a bearing face that is arranged for resting against the outer side of the flanges of the channel element;
an oblong metal anchoring element having a width smaller than the slot width and a length larger than the slot width, said anchoring element being located on the side of the washer element where the bearing face is located and has longitudinal end portions adapted to engage an inner side of the respective flanges of the channel element in a locking position of the anchoring element;
a connecting element which connects the anchoring element to the washer element, while allowing the anchoring element to rotate with respect to the washer element, in such a way that while holding the washer element, the channel fastener with its oblong anchoring element can be aligned with the longitudinal slot and the anchoring element can be inserted through the longitudinal slot into the channel element, and that subsequently after a rotation of the anchoring element, the anchoring element is in a locking position, in which it extends at an angle relative to the longitudinal slot; and
a torque-inducing element fixed to the anchoring element, the torque-inducing element including at least one resiliently deformable limb arranged substantially offset from a rotational axis of the anchoring element and adapted for a sliding engagement with at least one of the flanges of the channel element, such that when the anchoring element is inserted through the longitudinal slot into the channel element, said limb deforms to pass the flange while sliding along the flange towards the interior of the channel element, whereby a torque on the anchoring element is induced, so as to rotate the anchoring element in the channel element, whereby it is brought in the locking position in which it cannot be retracted through the longitudinal slot;
wherein the at least one resiliently deformable limb in an initial state extends from the anchoring element towards the washer element, wherein the resiliently deformable limb has a proximal end located at the anchoring element and a distal end located against the washer element.

16. The combination according to claim 15, wherein the channel element is a strut rail.

17. The combination according to claim 15, wherein the washer element has at least one bent edge portion which in a mounted state engages over one of an upper edge of the channel element, such that when the washer element is placed on the flanges of the channel element a rotation of the washer element relative to the channel element is blocked.

18. The combination according to claim 17, wherein, in the initial state, the distal end of the at least one limb engages the washer element at an inner side of the at least one bent edge portion.

19. The combination according to claim 15, wherein the washer element has two opposite bent edge portions which in a mounted state engage over upper edges of the channel element, such that when the washer element is placed on flanges of the channel element a rotation of the washer element relative to the channel element is blocked.

20. The combination according to claim 19, wherein the at least one resiliently deformable limb of the torque-inducing element comprises two resiliently deformable limbs, placed rotationally symmetric with respect to the rotational axis of the anchoring element, wherein the distal ends of the respective limbs engage the washer element at the opposite bent edge portions.

21. The combination according to claim 20, wherein the torque-inducing element comprises a support plate which has a surface matching to a side of the anchoring element facing away from the washer element, and at least two gripping fingers connected to longitudinal edges of the support plate adapted to fit around the anchoring element to keep the torque-inducing element located against the anchoring element, wherein the torque-inducing element is made immobile with respect to the anchoring element, and wherein the two resiliently deformable limbs are connected with their proximal ends to the longitudinal edges of the support plate, and are placed radially symmetric with respect to the rotational axis of the support plate.

22. The combination according to claim 21, wherein the torque-inducing element is produced as one piece from sheet metal or plastic.

23. The channel fastener according to claim 15, wherein the resiliently deformable limb is formed as a wing, wherein the wing is extending from a longitudinal edge of the anchoring element, and wherein the resilient deformation of the wing takes place substantially around the longitudinal edge of the anchoring element.

24. The combination according to claim 23, wherein the wing has a quadrilateral shape, positioned along at most one half of the longitudinal edge of the anchoring element and entirely offset from the rotational axis of the anchoring element.

25. The combination according to claim 23, wherein the wing has a longitudinal edge and a transverse edge, wherein the longitudinal edge of the wing is positioned along the longitudinal edge of the anchoring element, wherein the transverse edge is oblique with respect to the longitudinal edge, wherein the transverse edge slides along the flange of the channel element when the anchoring element is inserted through the longitudinal slot into the channel element.

26. The combination according to claim 15, wherein torque inducing element is configured and arranged on the anchoring element in such a way that, when the anchoring element is in its locking position in the channel element, the at least one limb extends with the distal end thereof into the longitudinal slot between the flanges of the channel element.

27. The combination according to claim 15, wherein the connecting element is adapted to vary the distance between the washer element and the anchoring element, whereby the channel fastener can be clamped on the flanges of the channel element after the anchoring element has rotated in the channel element.

28. The combination according to claim 27, wherein the connecting element comprises a spring, fixedly attached to the washer element on one end and fixedly attached to the anchoring element on the other end, wherein the spring is adapted to provide an axial and a rotational spring force.

29. The combination according to claim 27, wherein the connecting element comprises a male threaded fastener attached to the anchoring element, passing through a hole in the washer element in which it is freely rotatable, wherein the channel fastener can be clamped on the flanges of the channel element by fastening a nut to the male threaded fastener which tightens the washer element and the anchoring element around the flanges.

30. The combination according to claim 27, wherein the connecting element comprises a bolt, passing through a hole in the washer element in which it is freely rotatable and mating with a threaded hole in the anchoring element, wherein the channel fastener can be clamped on the flanges of the channel element by rotating the bolt, whereby the anchoring element and the washer element are tightened around the flanges.

31. The combination according to claim 15, wherein the washer element is formed as a channel-connector body for connecting the channel element to an additional channel element, the bearing face being arranged for resting against the outer side of the flanges of two channel elements, wherein an additional anchoring element connected to the washer element with the use of an additional connecting element, whereby the channel fastener is adapted to fasten two channel elements with respect to each other.

\* \* \* \* \*